Jan. 2, 1934.                L. E. HIRT                1,941,604
                             CONVEYER
                        Filed May 2, 1929
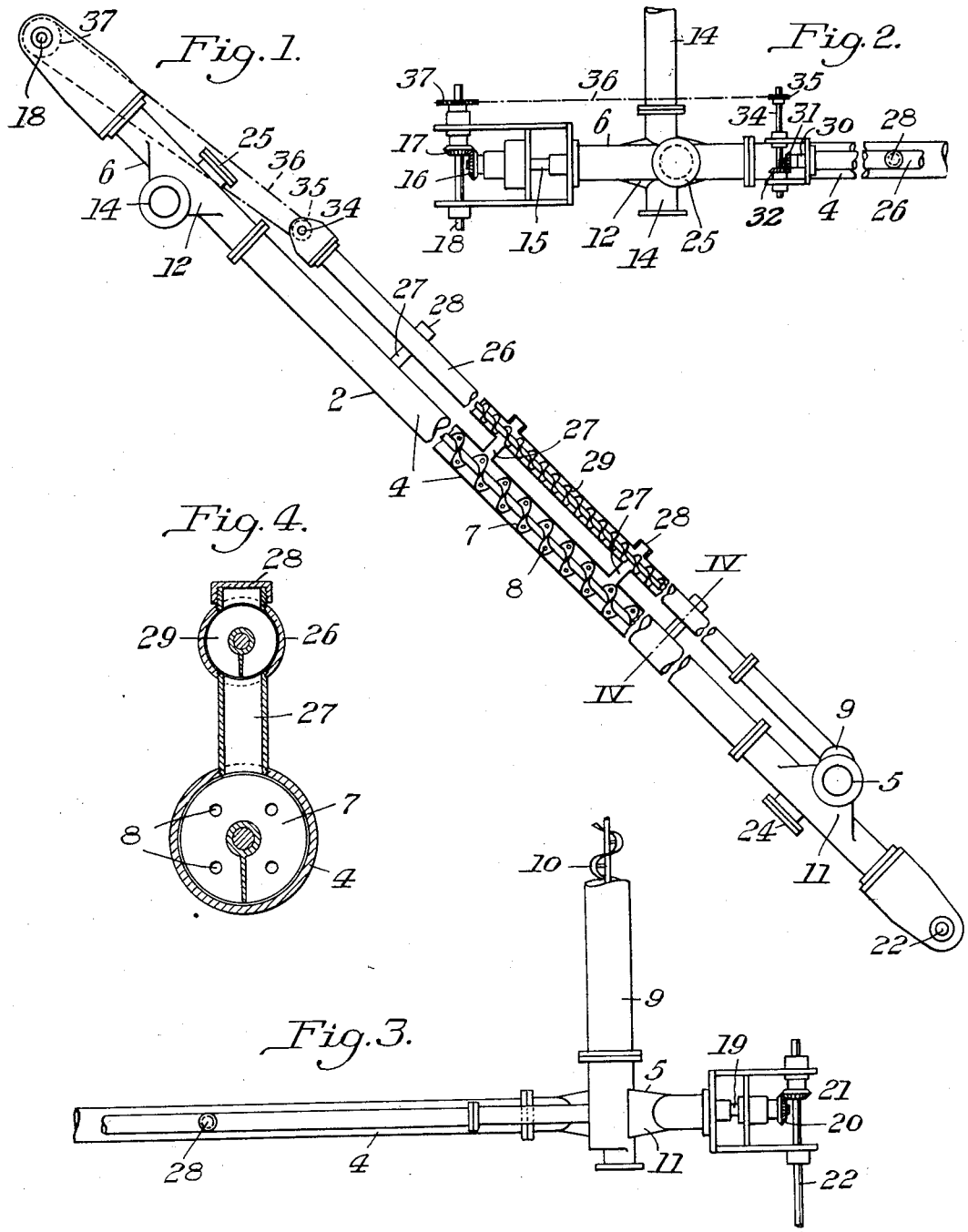

Patented Jan. 2, 1934

1,941,604

UNITED STATES PATENT OFFICE 1,941,604

CONVEYER

Leon E. Hirt, Fort Worth, Tex., assignor to Hirt Solvent Process Company, Fort Worth, Tex., a corporation of Delaware Application May 2, 1929. Serial No. 359,829

7 Claims. (Cl. 198—213)

My invention relate to conveyers and more particularly to conveyers having means for by-passing a main conveyer with a passageway through which excess material can escape, and thereby prevent clogging of the main conveyer.

In conveying materials and particularly materials containing a high percentage of liquid, difficulty is experienced in providing a smooth transfer of material along conveyers, and particularly along conveyers of the screw type. Due to irregularities in the rate at which materials are fed to the conveyer, and due to the natural tendency of the liquid to separate from the solid particles during movement through the conveyer, there is a tendency for the solid material to become packed in the conveyer. In many cases the packed material becomes so hard that the conveyer housing and/or screw are broken.

I provide a screw conveyer which normally moves material in one direction. To permit the escape of excess material or heavily packed material along the conveyer, it is by-passed by a passageway extending between the receiving and discharging ends of the main passageway. A conveyer is disposed in the by-pass for moving material in an opposite direction to the movement of material in the main conveyer, so that the excess material is returned to the entrance of the main conveyer.

Where different degrees of vacuum are maintained at the opposite ends of the main conveyer and by-pass, liquid tends to move toward the point of the higher vacuum. As a higher vacuum normally exists at the discharge end of the conveyer than at the receiving end, liquid moves through the conveyer even if the discharge end is higher than the receiving end, provided that the conveyers in the main passageway and the by-pass do not become filled with solid material, thereby sealing off portions of each from the effect of the condition of vacuum at the discharge end. In case a countercurrent to the moving material is desired, a higher vacuum may be maintained at the receiving end.

One application for the use of such a conveyer is in handling materials from which oils are being extracted, as described in my co-pending application, Serial No. 334,210, filed January 22, 1929. In that application a lifting conveyer is utilized for raising material containing liquids from which oils are extracted under a condition of vacuum during an intermediate step in the treatment of the materials. The conveyer of the present invention is particularly adapted for such uses, although it is to be understood that its application is not limited thereto, but that it is of general application.

The accompanying drawing illustrates a present preferred embodiment of the invention, in which Figure 1 is a broken view, partially in section, of a conveyer embodying my invention, Figure 2 is a plan view of the upper end of the conveyer, Figure 3 is a plan view of the lower end of the conveyer, and Figure 4 is a transverse sectional view of the conveyer taken substantially along the section line IV—IV of Figure 1.

Referring to the drawing, a conveying device 2 comprises a housing 4, preferably of cylindrical shape, which extends between a receiving device 5 and a discharging device 6. A conveyer 7, here illustrated in the form of a conveying screw extends longitudinally of the housing 4 for conveying material therealong. Where the material being handled by the conveyer is in a semi-liquid state and there is a possibility of clogging, the conveyer 7 may be supplied with small openings 8 for permitting the escape of material against the movement of the conveyer should the housing tend to become clogged. The use of the openings 8 is optional.

Material is supplied to the receiving device 5 by a conveyer housed in a casing 9, preferably of oval shape, in order to prevent clogging, as the oval shape of the housing permits a ribbon conveyer 10 to be disposed near the bottom of the casing 9 and permits fluid and solid matter to move over the top of the conveyer. Such use of oval shaped casings is shown and described in my above identified application. The conveyer 10 delivers material to a hopper 11, through which the conveyer 7 extends. The conveyer 7 moves the material from the receiving device 5 to the discharge device 6 and, as illustrated in Figure 1, the latter may be disposed at a higher elevation than the former.

The discharge device 6 comprises a hopper 12 disposed at the end of the housing 4 and from which a conveyer housing 14 extends to other apparatus not shown. An extension 15 on the conveyer 7 extends through the hopper 12 and terminates in a gear 16, which meshes with a bevel gear 17 mounted on a driving shaft 18. An extension 19 on the other end of the conveyer 7 also terminates in a bevel gear 20 meshing with a gear 21 on a shaft 22. Accordingly, when a source of power is attached to either of the shafts 18 or 22 the conveyer 7 is rotated. The housing 4 is provided with man-holes 24 and 25 for gaining access to the hoppers 11 and 12, respectively.

To prevent clogging of the conveyer 7 in the housing 4 from any cause, the housing 4 is provided with a by-passing housing 26 which extends along the upper surface of the housing 4 to which it is connected by hollow connections 27 opening into both the housings 4 and 26 for establishing communicating passageways therebetween. The lower end of the housing 26 communicates with the casing 9 above the hopper 11. The outer ends of the connections 27 are closed by caps 28. A screw or ribbon conveyer 29 extends longitudinally of the housing 26.

For rotating the conveyer 29, an extension 30 thereof is provided with a bevel gear 31 meshing with a bevel gear 32 on a shaft 34. The shaft 34 is provided with a pulley 35 connected by a chain 36 to a pulley 37 mounted on the shaft 18. By disposing the gears 17 and 32 at diametrically opposite sides of the conveyers 7 and 29, respectively, the conveyers are rotated in opposite directions. It is to be understood, however, that opposite movement of the conveyers could be had by crossing the chain 36 and keeping the gears on the same sides of their cooperating conveyers, and also by using a left hand and a right hand conveyer.

Should the material in engagement with the conveyer 7 tend to become clogged in the housing 4, portions of it may escape through the connections 27 to the conveyer 29, which returns it to the hopper 11, thereby relieving the conveyer 7 and housing 4. The movement of the material down the conveyer 29 tends to compress it and drain and separate the solvent. In practice the relative sizes of the housings 4 and 26 may be in the order of six and three inches in diameter, respectively, although it is to be understood that these values are given by way of illustration only and not by way of limitation.

Where the conveyer is used in connection with processes maintaining a higher vacuum at the discharge end than at the receiving end, liquid separated by the conveyers 7 and 29 tends to move towards the discharge end, even though the conveyer 29 positively returns some of the liquid and solid matter to the receiving end. For certain processes, especially where the solvent is heavier than the material being treated, a countercurrent of solvent to the direction of flow of raw material may be desirable. This is obtained by having the vacuum highest at the receiving end of the conveyer. It is to be understood that the casing 9 may be provided with suitable seals, or the material traversing the casing may itself constitute a seal at the receiving end of the conveyer for maintaining a condition of differential pressure between the receiving device 5 and discharging device 6.

While I have illustrated and described a present preferred embodiment of my invention, it is to be understood that the invention may be otherwise embodied without departing from the spirit of the invention or the scope of the appended claims.

I claim:

1. The combination with a material conveyer having supply and discharge means, of a return conveyer disposed thereabove having a plurality of inlet connections therewith intermediate its ends, and a discharge connection to the supply means of the first-mentioned conveyer.

2. The combination with a lifting screw conveyer having an inlet and an outlet, of a by-passing conveyer connected to the first-mentioned conveyer at a plurality of points between said inlet and outlet and located thereabove for removing excess material, and a connection between the discharge end of the by-passing conveyer, and the inlet of the screw conveyer.

3. In a screw conveyer having a close fitting housing, and an intake, a plurality of packing-pressure relief ports in said housing between the ends thereof, and an auxiliary conveyer above the screw conveyer for returning material discharged therefrom to the intake of the screw conveyer.

4. Apparatus for handling a mixture of solid particles and liquid comprising a housing, a supply hopper at one end thereof and a discharge port at the other, a screw conveyer in the housing for moving material from the supply hopper to the discharge port, and a return conveyer above the housing communicating therewith between said hopper and port, for returning excess material to said supply hopper.

5. A conveyer mechanism comprising a housing, a supply hopper and a discharge port therefor, and a conveyer within the housing, an auxiliary conveyer communicating with said housing at at least one point between said hopper and port, and located thereabove for diverting material from said housing to said hopper.

6. A conveyer system comprising a main conveyer having an inlet and an outlet, and an auxiliary conveyer having a plurality of inlets communicating with the main conveyer between the inlet and outlet thereof, said auxiliary conveyer also having an outlet communicating with the inlet of the main conveyer.

7. In a conveyer, the combination with an inclined tubular housing, a screw conveyer rotatable therein for raising material through said housing, of means for relieving the packing of a material in said housing comprising an auxiliary conveyer connected to said housing at a plurality of points between the ends thereof, for returning the material from said housing to the lower end thereof.

LEON E. HIRT.